W. A. KIRBEY.
Harvester.
No. 673. Reissued March 15, 1859.
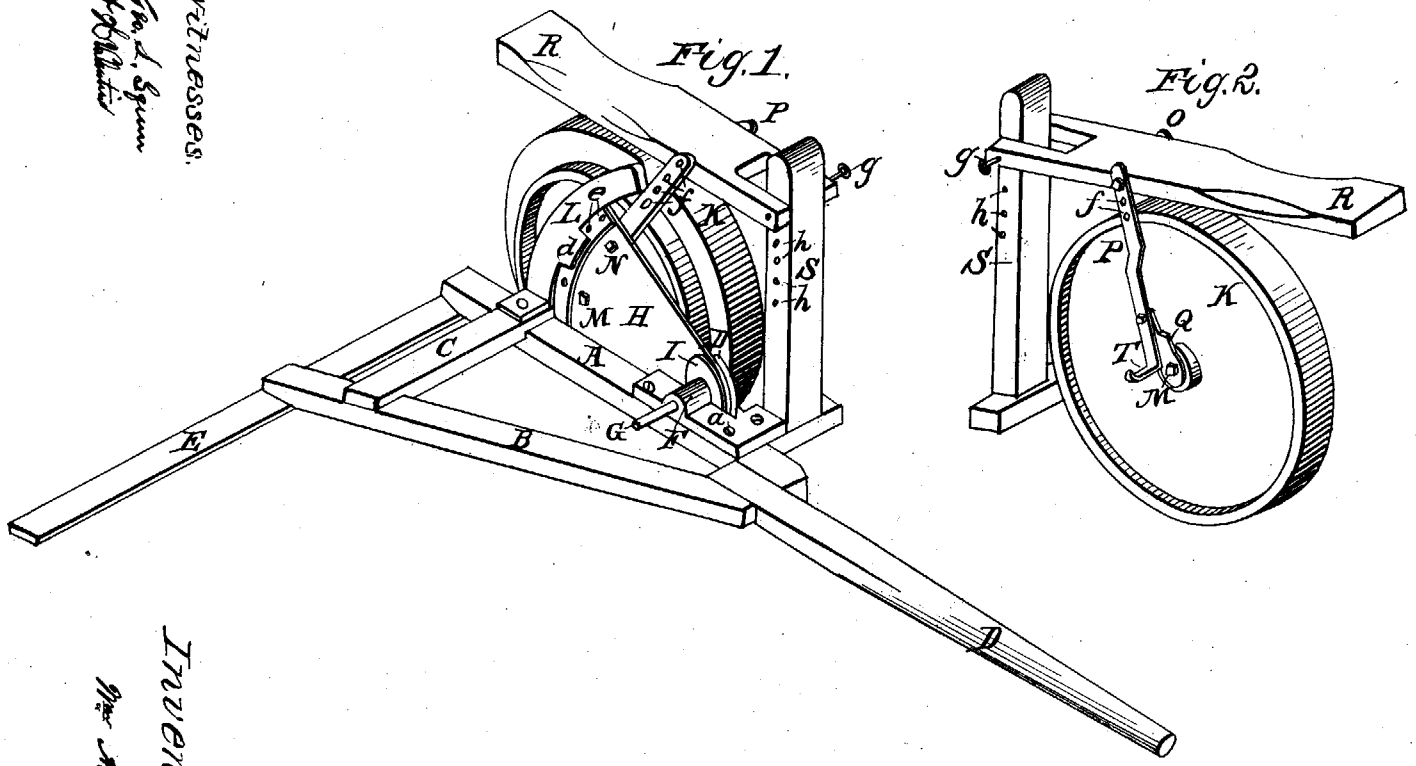
Witnesses.
Geo. L. Squire
H. H. Valentine
Inventor.
Wm. A. Kirby
N. PETERS, Photo-Lithographer, Washington, D. C.

UNITED STATES PATENT OFFICE.

WILLIAM A. KIRBY, OF BUFFALO, NEW YORK.

IMPROVEMENT IN HARVESTING-MACHINES.

Specification forming part of Letters Patent No. 15,659, dated September 2, 1856; Reissue No. 673, dated March 15, 1859.

*To all whom it may concern:*

Be it known that I, WILLIAM A. KIRBY, of Buffalo, in the county of Erie and State of New York, have invented certain new and useful Improvements in Harvesting-Machines; and I do hereby declare the following to be a full, clear, and exact description of the construction and operation of the same, reference being had to the accompanying drawings, making a part of this specification, in which—

Figure 1 represents a perspective view of so much of a harvesting-machine as will illustrate the character of my invention. Fig. 2 represents a perspective view taken from the opposite side of the machine from that shown in Fig. 1, and shows the manner of supporting the seat and driver on the main wheel.

Similar leters of reference, where they occur in the separate figures, denote like parts of the machine in both the figures.

The nature of my invention relates to the manner of hanging or uniting the frame of a harvesting-machine to the main supporting-wheel so that the former may be raised or lowered and balanced on the latter to suit the special character of the ground over which it is to be worked or the work to be done by it; and my invention further relates to the manner of attaching a lever-seat to the main frame and wheel so that the weight of the driver may be used in raising or balancing the machine and transferring the weight upon the main or drive wheel.

To enable others skilled in the art to make and use my invention, I will proceed to describe the same with reference to the drawings.

The frame is of a triangular shape, (A B C forming the three sides of the triangle,) to which frame all the remaining portions of the machine may be connected. The tongue D is connected to this frame rigidly at its front, and the finger-bar E at its rear.

In a suitable metallic box or block, F, on the part A of the frame is substantially fixed a journal or shaft, G, so as to freely turn in said box. A hub also projects from this block F, on which is placed a segmental or radial plate, H, said plate having a hub, I, upon it, which gives it a proper support on the projection of the box F. There is also a flange or guide-piece, *a*, on the segmental plate H, which projects into a slot or recess in the block F to steady said segmental plate on its journal or bearing when turning thereon.

*b* is a pulley fast on the shaft G, which may bear against a circular flange, J, on the inner face of the main driving and supporting wheel K, so as to receive motion therefrom; or *b* may be a cogged pinion and the flange J a cogged flange taking into it, or an endless belt may be used around the two, the object being to get motion from the main wheel and transmit it to the cutters through the shaft G or to a reel or rake, as may be desired.

L is a segmental rim, supported on the frame-piece C, and furnished with a groove or way, *c*, in its inner perimeter, into which groove or way the outer edge of the plate H moves and is supported. A projecting piece, *d*, is also formed on the inner perimeter of the rim L, against which an adjusting-pin placed in either of the series of holes *e e*, &c., may catch to hold the frame when properly adjusted on the main wheel K.

On the segmental plate H is wrought or cast in a journal, M, for supporting the main wheel K, and to said plate is also pivoted by a bolt or pin, N, a brace or support, O, provided with a series of adjusting-holes, *f f*, &c. A support or brace, P, corresponding to that (O) on the opposite side of the wheel, is pivoted to an arm, Q, connected with or fastened to the journal or axle M of the main wheel K, as seen in Fig. 2, and similarly provided with adjusting-holes *f*, &c. To these two braces or supports O P is hung a seat, R, (for the driver or conductor,) which, besides having a pivoted connection with the supports, is also hinged and made adjustable in the standard S by a pin, *g*, which may pass through its end and through said standard at any of the adjustments *h*, &c. The lower end of the brace or support P may be formed into a stirrup, T, to make a foot-support for the driver, the axle M being the main supporting part of said stirrup, inasmuch as the support P is connected to or with the axle, and thus forms the place for the stirrup. By thus pivoting the plate H to the frame, and hanging the wheel K to said plate, and also pivoting the seat R (which is also a lever) to the plate H and the standard S, the frame can be raised or lowered and balanced on the wheel at pleasure; but in raising or lowering the frame the position of the seat R changes, for it may be the lever by which the raising or lowering is done, and some provision must be made for bringing it back into a convenient or effective position. This is done by the adjustments heretofore mentioned in the braces O P and standard S. By these connections, too, I not only make the adjustments that are necessary for high or low cutting with great facility, but I dispense with much of the framework heretofore used, and consequently make the machine lighter and cheaper than heretofore done. The peculiar position and manner of hanging the seat make the weight of the driver or conductor on its rear portion act as a counterpoise or balance to raise and hold up the front part of the machine. The pin is to be inserted in one of the holes *e* underneath the projection *d*, so that when the machine is cutting low or the frame is on or close to the ground and the driving-wheel K should drop into a depression of any kind it will still be in contact with the ground and continue to drive the cutter-bar, which it could not do were it permanently adjusted to the frame and the frame come in contact with the ground. Any sudden jar communicated to a machine with a stiff tongue is thrown violently upon the horses' necks; but by my manner of hanging the seat the weight of the driver, when the machine strikes any obstacle, tends to raise up and ease the jar, and thus relieve the horses.

It will be perceived that I have no frame outside of the main wheel, but simply a seat-support and a foot-rest, which are connected to the journal or axle of the wheel, and which aid the driver in converting his seat into a lever for raising up or easing the machine over any obstruction in its path. The triangular frame, to which all the other parts of the machine are connected, is on the cutter-bar side of the main wheel. There is but one support to the journal or axle of the main wheel, and that on the side where the main frame is placed.

Having thus fully described the nature and object of my invention, what I claim therein as new, and desire to secure by Letters Patent, is—

1. The combination of the single plate H and main wheel, substantially as described.

2. The combination of the main wheel K, single plate H, and rim L, when connected together and operating in the manner and for the purpose set forth.

3. Placing a vibrating wheel on the outside of the frame, or so that the outside of the frame does not bear on the outside of the wheel, in combination with the triangular-shaped frame on the inside of the wheel, substantially as described.

4. Hanging the seat to the plate H and to the standard S, in the manner and for the purpose set forth.

5. A hinged lever-seat and outside stirrup or supporter, in combination with a wheel having no outside frame or support, substantially as herein represented.

WM. A. KIRBY.

Witnesses:

A. B. STOUGHTON,

THOS. H. UPPERMAN.